Figure 1:
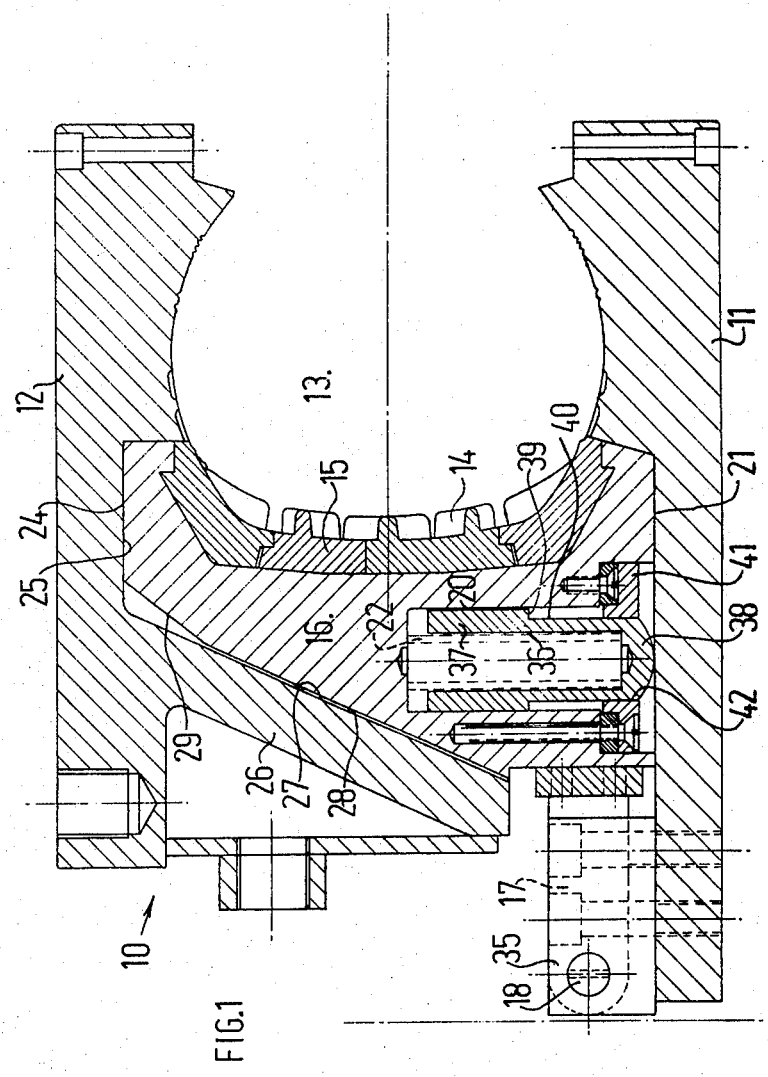

United States Patent [19]
Tippin

[11] B 3,989,791

[45] Nov. 2, 1976

[54] METHOD AND APPARATUS FOR MOULDING TIRES EMPLOYING PIVOTING TREAD FORMING SEGMENTS

[75] Inventor: Arthur David Tippin, Tamworth, England

[73] Assignee: Dunlop Limited, Birmingham, England

[22] Filed: July 2, 1974

[21] Appl. No.: 485,169

[44] Published under the second Trial Voluntary Protest Program on March 16, 1976 as document No. B 485,169.

[30] Foreign Application Priority Data

July 12, 1973 United Kingdom............... 33223/73

[52] U.S. Cl.............................. 264/315; 264/326; 425/46; 425/47
[51] Int. Cl.² ........................................ B29H 5/02
[58] Field of Search..................... 264/36, 315, 326; 425/32, 33, 35, 36, 39, 44, 46, 47

[56] References Cited
UNITED STATES PATENTS

| 3,505,447 | 4/1970 | Billes | 264/326 X |
|---|---|---|---|
| 3,704,082 | 11/1972 | Hottle | 425/46 |
| 3,730,658 | 5/1973 | Marra | 425/47 |
| 3,806,288 | 4/1974 | Materick | 425/47 |
| 3,817,670 | 6/1974 | Leblond | 425/47 X |

FOREIGN PATENTS OR APPLICATIONS

| 1,160,606 | 1/1964 | Germany | 425/47 |
|---|---|---|---|
| 2,000,796 | 7/1971 | Germany | 425/46 |
| 1,920,836 | 10/1963 | Germany | |
| 1,168,716 | 10/1969 | United Kingdom | |

*Primary Examiner*—Jan H. Silbaugh
*Attorney, Agent, or Firm*—Stevens, Davis, Miller & Mosher

[57] ABSTRACT

To permit moulding of a rigid breaker tire in a single-phase diaphragm press without damage caused by axial movement of the tread-forming segments relative to the tire carcass in the mould the tread segments are mounted to pivot about fixed longitudinal axes as the press is opened and closed so that they move simultaneously both radially and axially with respect to the mould cavity.

5 Claims, 4 Drawing Figures

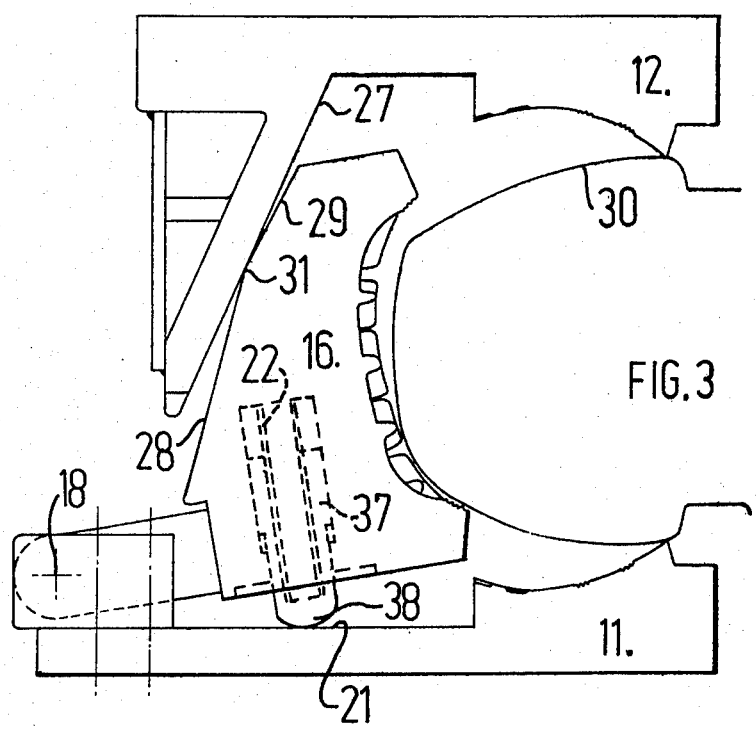

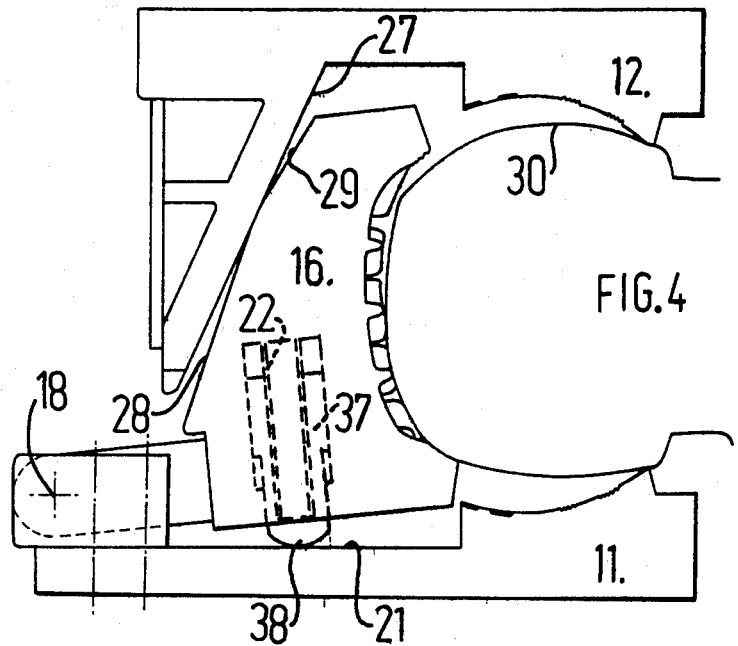

METHOD AND APPARATUS FOR MOULDING TIRES EMPLOYING PIVOTING TREAD FORMING SEGMENTS

The present invention relates to improvements in tire moulds and more particularly to an improved mould for use in forming and curing rigid breaker tires, and a method of using such mould.

When moulding tires which have rigid breakers below the treat two problems arise which are attributable to the breakers. Firstly, as it is necessary to build these tires so that the breaker is initially at or near to its final diameter (i.e. the tire is similarly at or near its full diameter), a method must be found which permits the tread pattern of the mould to be inserted into the treat rubber of the tire carcass with little or no relative axial movement between tire and mould, otherwise it is possible that the breaker will be moved off centre. Secondly, when removing the cured tire from the mould the relative axial movement between the tire tread and the mould pattern must again be restricted or the breaker may be deformed and/or pieces of tread rubber may be torn away.

Previously, two distinct types of segmental mould have been used to overcome these problems, namely the "single-phase" mould, in which the tread-forming segments are moved radially inwards while the upper mould part is moved downwards, and the "two-phase" mould in which the upper mould part is lowered to its final position before the tread-forming segments are moved inwards.

The two-phase mould has the disadvantage of being a more complex, more expensive mould and requires a special facility which allows the press closure to give rise to two distinct movements in perpendicular planes.

The simpler single-phase type of mould is satisfactory and is therefore to be preferred if the tread pattern to be formed permits it to be used without the above problems arising, or when using a "bag press" in which, instead of a diaphragm, a toroidal bag is inserted into the tire prior to the moulding operation and removed afterward. As this is a laborious and time-consuming operation the diaphragm press is preferable but with diaphragm presses, problems can arise because the shape of the tire changes as the diaphragm shape is altered by the downward movement of the upper mould part, thus causing the tread region of the tire to move downwards at half the rate of the upper mould part. During this time the tread-forming segments move radially inwards along the lower mould part. From the time that each tread-forming segment first touches the tread rubber until the mould is fully closed there is a downward movement of the rubber relative to the tread-forming segment which can produce undesirable rubber flow. To put the matter into perspective it should be said that the problem can vary from being unimportant where shallow patterns which are "flat" across their width are used to becoming serious to the point of making the diaphragm, single-phase press method inworkable when patterns continue for some distance around the shoulder of the tire because then the tops of the C-section tread-forming segments foul the tread rubber very early in the closing of the mould.

An object of the present invention is to overcome the above difficulty encountered with single-phase moulds in diaphragm type presses by imparting to the segments simultaneous downward and inward movements so that each segment will follow-down the tread region of the tire to the final closed position while the tread-forming pattern penetrates the rubber.

According to the invention there is provided a tire mould comprising upper and lower mould parts relatively movable to open and close the mould and in the closed position defining a circular, tire-forming mould cavity, and a plurality of tread-forming segments movable relative to said mould parts and, in an operative position thereof, adapted to engage the circumference of a tire or tire carcass inserted in the cavity, wherein means is provided for displacing the tread segments both axially and inwardly of the cavity to their operative position during closure of the mould.

According to another aspect of the invention there is provided a diaphragm tire press incorporating a mould as described in the previous paragraph.

Preferably the lower mould part is stationary and the upper mould part is adapted to be raised and lowered to open and close the mould and the tread segments are movable downwardly toward the stationary mould part and inwardly of the mould cavity in response to lowering of the upper mould part.

Biasing means may be provided for displacing the tread-forming segments upwardly from the lower mould part and outwardly of the mould cavity to an inoperative position, the upper mould part and tread-forming segments may have co-operating cam surfaces engageable as the upper mould part is lowered to displace the tread-forming segments to their operative position against the action of the biassing means.

The tread-forming segments are preferably pivotable relative to the lower mould part about individual axes all lying in a plane perpendicular to the axis of the cavity of the closed mould.

According to another aspect of the invention there is provided a method of tire moulding which comprises locating on a first mould part a tire or tire carcass of bowed configuration in radial section such that the beads are wider apart than any other part of the tire, inflating a diaphragm to enter the tire or carcass, closing a second mould part relative to the first part to deform the tire or carcass generally to C-shape in radial section and provide a circular mould cavity enclosing the tire or carcass, and simultaneously with closure of the mould displacing both axially and inwardly of the mould cavity a plurality of segments adapted to form a tread on the tire or carcass, said axial displacement of said segments being generally coincident with axial displacement of the tread portion of the tire or carcass during said deformation thereof.

Preferably the tread forming segments are jointly angularly moved by the second mould part, on closure of the latter, about respective axes all lying in a plane to which the axis of the mould cavity is perpendicular.

Figure 2:
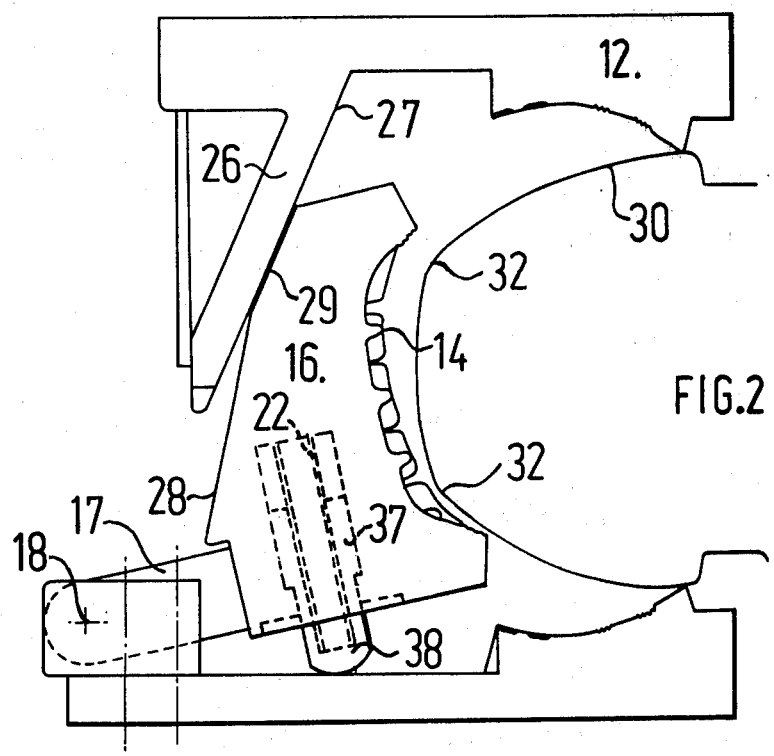

A preferred embodiment of the present invention will now be described with reference to the accompanying drawings in which:

FIG. 1 is a cross-sectional view of a tyre mould in accordance with the invention taken in a plane containing the axis of the mould cavity and showing the mould fully closed. and FIGS. 2, 3 and 4 are views similar to FIG. 1, illustrating the mould in the opened and two intermediate positions, respectively.

The mould 10 illustrated comprises a lower, stationary mould part 11 and an upper mould part 12 which is vertically movable relative to the part 11 to open and close the mould. In the closed position illustrated in FIG. 1, the parts 11 and 12 together define a circular mould cavity 13, the circumferential wall of which is formed by a tread pattern 14 located on the inner faces 15 of a plurality of tread-forming segments 16 located in side-by-side relation circumferentially to surround the cavity 13. As is known per se, the lateral dimensions of the segments 16 are such that they contact one another when in the operative position shown in FIG. 1 to form a continuous ring, so that there are no spaces in the formed tread.

Each segment 16 has an arm 17 extending radially outwardly of the enclosure 13 and engaged at its free end by a pin 18 rotatably mounted in lugs 35 upstanding from the stationary part 11. In this way each segment 16 is pivotally connected to the stationary mould part to be rotatable about an axis which lies in a plane to which the axis of the cavity 13 is perpendicular. However this arm 17 is a loose fit between the lugs 35 and the pin 18 is a loose fit in the lugs (having a clearance of about 0.5 mm) so that the final position of the segment 16 when the mould is closed is not determind by its pivotal connection to the mould part 11 but by the cooperating cam surfaces 27,28 described below. Each segment 16 is also formed with two blind bores 20 (only one being visible in the drawings) opening to its underside 21, in each of which a compression spring 22 is located.

In each bore 20 a plunger 37 is reciprocable, the plunger containing the associated spring 22 in a blind bore 36 stopped by an outwardly domed end 38 of the plunger. The end portion 40 of this plunger adjacent the domed end 38 is of reduced diameter providing a shoulder 39. When the plunger 37 is fully extended out of the bore 20 by the spring 22 the shoulder 39 abuts a plate 41 secured to the segment 16 at the open end of the bore 20, the plate 41 having an aperture 42 through which only the end portion 40 of the plunger can pass.

As the segment 16 is arcuately moved about its pivot pin 18 the domed end 38 of the plunger slides over the upper surface of the lower mould part 11. The maximum raised position of the segments is determined by the shoulder 39 of each associated plunger 37. In the position of the segment 16 shown in FIG. 1, in which its underside 21 is contiguous with the stationary mould part 11. the springs 22 are under load, biassing the segment 16 to move upwardly to the position shown in FIG. 2.

When the mould 10 is closed, as shown in FIG. 1, each segment 16 is held in the operative position against the bias of the associated springs 22 by contact of the upper surface 24 of each segment 16 with the undersurface 25 of the movable mould part 12. Extending downwardly and outwardly of the upper mould part 12 is an annular tapered ring 26, the frusto-conical inner surface 27 of which is parallel and in contact with a major cam surface 28 of each segment 16 when the press is closed.

When the mould is opened the upper mould part 12 moves upwards but despite the springs 22 and the segments 16 remain in their closed position shown in FIG. 1 through adhesion to the formed tire and keying of the tread pattern 14 in the tire. The formed tire is then moved upwards by means of a device extraneous to the mould and each segment 16 passed sequentially through the positions shown in FIGS. 4 and 3 to the position shown in FIG. 2, the tread-forming patterns 14 peeling out of the formed tread. In the position of FIG. 2 a minor cam surface 29 of each segment 16 above the major cam surface 28 is in contact with the tapered ring 26. Excessive further upward movement of the segments 16 by their springs 22 beyond the position shown in FIG. 2 is prevented by the shoulders 39 of the plungers 37 contacting the associated plates 41.

A tire or tire carcass (indicated at 30 in FIGS. 2, 3 and 4) is inserted in the open mould to rest in the half of the cavity 13 defind by the stationary part 11 of the mould. At this stage the tire 30 is bowed in radial cross-section so that its beads are widely separated to facilitate entry of a diaphragm (not shown) at the centre of the mould, which is now inflated to enter and support the tire 30. The upper part 12 of the mould is now lowered until it reaches the position of FIG. 2.

In this position the segments 16 are raised to the maximum permitted extent by their springs 22, and by arcuately moving about the respective pivots 18 are also displaced radially outwardly of the cavity 13, permitting the tire 30 to be located in the cavity 13 without any contact between the tread-forming pattern 14 and the tire. In the position of FIG. 2 the surface 27 of the tapered ring 26 is about to come into contact with the minor cam surface 29 of each segment 16, with which is it approximately parallel. Further depression of the upper part 12 of the mould causes the positions of FIGS. 3, 4 and 1 to be reached successively, the surface 27 of the upper part 12 of the mould acting successively on the minor cam surfaces 29, the junction 31 between this and the major cam surface 28 and finally the major cam surface 28 to move each segment 16 downwardly to the upper surface 21 of the stationary part 11 of the mould against the action of the springs 22, each segment 16 rotating about its pin 18 so as simultaneously to move downwardly and radially inwardly of the cavity 13.

The tire 30 is a radial ply tire incorporating steel breakers (not shown) and during closure of the press the radial sectional shape of the tire 30 is changed from a bowed configuraton of large radius in which the beads are wider than any other parts of the tire, to a C-shape as its beads are moved toward one another. This axial deformation of the tire 30 causes its tread portion (generally between the points indicated at 32 in FIG. 2) to move downwardly axially of the cavity 13, but because the movement of the segments 16, more especially when in contact with the tire 30, has a component axial of the cavity 13 the tread-forming pattern 14 of each segment 16 remains substantially in alignment with the tread portion 32—32 of the tire 30 throughout closure of the press. Thus entry of the tread pattern 14 into the tire 30 along an arcuate path reduces or eliminates distorting action of the segments 16 on the tire 30 during mould closure and alteration of the shape of the tire and ensures that when the mould is fully closed (FIG. 1 position) the tread-forming pattern is properly aligned with the tread section 32—32 of the preformed tire 30 and therefore with the breakers under the formed tread.

Similarly, when the formed tire is lifted out of the opened mould the segments 16 travel upwardly with it to their predetermined limits moving upwardly and away from the cavity 13 in such a way that the tread pattern 14 is withdrawn from the formed tread without any shearing action in the axial direction of the tire 30.

It will be appreciated that the position of the pin 18 relative to the radially inner face 15 of each segment 16 must be carefully chosen so that the face 15 will have the requisite inward as well as axial movement relative to the mould cavity 13 during closure of the mould. It must also be such that the top end of the face 15 nearest the mould part 12 moves far enough outwardly of the mould cavity 13 during opening of the mould to permit insertion of a new tire or tire carcass into the opened mould.

Having now described my invention, what I claim is:

1. A method of moulding a tire which comprises locating on a first mould part a tire or tire carcass of bowed configuration in radial section such that the beads are wider apart than any other parts of the tire, inflating a diaphragm to enter the tire or carcass, moving a second mould part relative to the first part to close the mold and to deform the tire or carcass generally to C-shape in radial section and provide a circular mould cavity enclosing the tire or carcass, and simultaneously with closure of the mould, jointly angularly moving by means of the second mould part a plurality of segments adapted to form a tread on the tire or carcass whereby the segments pivot about respective pivot axes all lying in a plane to which the axis of the mould cavity is perpendicular and are therefore displaced by the second mould part both axially and inwardly of the mould cavity to final molding position, said axial displacement of said segments being generally coincident with axial displacement of the tread portion of the tire or carcass during said deformation thereof.

2. A tire mould comprising upper and lower mould parts, the upper mould part being arranged to be raised and lowered to open and close the mould and in its closed position defining with the lower mould part a circular, tire forming cavity, a plurality of tread forming segments pivotable relative to the lower mould part about individual axes all lying in a plane perpendicular to the axis of the cavity of the closed mould between a final molding position in which the segments are arranged to engage the circumference of a tire or tire carcass inserted in the cavity and an inoperative position spaced radially outwardly of the cavity from the final molding position, each segment moving in an arcuate path about the respective axis thereof and therefore both radially and axially of the cavity, the upper mould part having a cam surface which co-operates with cam surfaces of the segments as the mould is closed whereby the segments are jointly displaced in said arcuate paths from their inoperative position to their final molding position by the upper mould part as the latter moves to the closed position.

3. A tire mould as claimed in claim 2, wherein the segments are spring biased toward their inoperative positions.

4. A single-phase diaphragm tire press comprising an inflatable diaphragm locatable coaxially with respect to the circular, tire forming cavity of a tire mould which includes a stationary lower part and an upper part which can be raised and lowered to open and close the mould, the mould also comprising a plurality of tread forming segments pivotable relative to the lower mould part about individual axes, fixed relative to the lower mould part, all lying in a plane perpendicular to the axis of the cavity of the closed mould, biassing means being provided for pivoting each of said segments about the respective axis thereof upwardly of the lower mould part and outwardly of the mould cavity when the upper mould part is raised and the tread forming segments and the upper mould part having cooperating cam surfaces whereby as the upper mould part is lowered to close the mould the tread forming segments are pivoted from their inoperative positions about their respective axes against the action of said biassing means both axially and inwardly of the mould cavity to final molding positions adjacent the lower mould part.

5. A press as claimed in claim 4, wherein said biassing means comprises at least one spring-loaded plunger reciprocable into and out of an associated bore in each segment and having a domed free end portion in abutment with the lower mould part and adapted to slide over the same as the segment is angularly moved.

* * * * *